US008738472B2

(12) United States Patent
Hallowell et al.

(10) Patent No.: US 8,738,472 B2
(45) Date of Patent: May 27, 2014

(54) SYSTEMS AND METHODS FOR VEHICLE LIFECYCLE MANAGEMENT

(75) Inventors: Zachary Emerson Hallowell, San Francisco, CA (US); Clarence Joseph Hammond, Fremont, CA (US)

(73) Assignee: Openlane, Inc., Redwood City, CA (US)

( * ) Notice: Subject to any disclaimer, the term of this patent is extended or adjusted under 35 U.S.C. 154(b) by 121 days.

(21) Appl. No.: 11/685,120

(22) Filed: Mar. 12, 2007

(65) Prior Publication Data

US 2008/0140543 A1  Jun. 12, 2008

Related U.S. Application Data

(60) Provisional application No. 60/781,166, filed on Mar. 10, 2006.

(51) Int. Cl.
*G06Q 10/00* (2012.01)

(52) U.S. Cl.
USPC ............................. 705/28; 705/14.24; 705/22

(58) Field of Classification Search
USPC .......................................................... 705/28
See application file for complete search history.

(56) References Cited

U.S. PATENT DOCUMENTS

| | | | |
|---|---|---|---|
| 4,774,664 A | | 9/1988 | Campbell et al. |
| 5,764,628 A | | 6/1998 | Davis et al. |
| 5,774,873 A | * | 6/1998 | Berent et al. .................. 705/26.3 |
| 5,794,219 A | | 8/1998 | Brown |
| 5,812,070 A | * | 9/1998 | Tagami et al. ............. 340/932.2 |
| 5,818,914 A | | 10/1998 | Fujisaki |
| 5,835,236 A | | 11/1998 | Barbari |
| 5,835,896 A | | 11/1998 | Fisher et al. |
| 5,856,931 A | | 1/1999 | McCasland |
| 5,857,159 A | | 1/1999 | Dickrell et al. |
| 5,890,138 A | | 3/1999 | Godin et al. |
| 5,905,974 A | | 5/1999 | Fraser et al. |
| 5,905,975 A | | 5/1999 | Ausubel |
| 5,915,209 A | | 6/1999 | Lawrence |
| 5,966,699 A | | 10/1999 | Zandi |

(Continued)

FOREIGN PATENT DOCUMENTS

| WO | WO 2007/009003 A2 | 1/2007 |
|---|---|---|
| WO | WO 2007/009003 A3 | 1/2007 |

OTHER PUBLICATIONS

AutoTradeCenter, 2004 http://web.archive.org/web/20050125180848/http://autotradecenter.com/.*

(Continued)

*Primary Examiner* — Fateh Obaid
(74) *Attorney, Agent, or Firm* — Gregory & Sawrie LLP

(57) ABSTRACT

A computerized system for vehicle management and purchase. The system may include a database including information regarding vehicles in a set of vehicles, wherein a plurality of the vehicles in the set of vehicles are in arrangements wherein third parties use the vehicles, wherein the information includes configuration of respective vehicles. The system may also include a computer interface that provides access to the description of the vehicles in the database and provides for setting price of respective vehicles; an option on the user interface to search; an option on the user interface to indicate intent to purchase a vehicle; a computer interface that receives information regarding a vehicle returned; and a computer interface to facilitate a purchase of the returned vehicle. Also described are an Internet-based system including a web server; a method for vehicle management and purchase; and a vehicle management and purchase system.

28 Claims, 7 Drawing Sheets

(56) References Cited

U.S. PATENT DOCUMENTS

| | | | |
|---|---|---|---|
| 5,978,776 A | 11/1999 | Seretti et al. | |
| 6,006,148 A | 12/1999 | Strong | |
| 6,006,201 A | 12/1999 | Berent et al. | |
| 6,012,045 A | 1/2000 | Barzilai et al. | |
| 6,021,398 A | 2/2000 | Ausubel | |
| 6,023,685 A | 2/2000 | Brett et al. | |
| 6,023,687 A | 2/2000 | Weatherly et al. | |
| 6,026,163 A | 2/2000 | Micali | |
| 6,038,597 A | 3/2000 | Van Vyngarden | |
| 6,041,310 A | 3/2000 | Green et al. | |
| 6,049,784 A | 4/2000 | Weatherly et al. | |
| 6,055,518 A | 4/2000 | Franklin et al. | |
| 6,061,789 A | 5/2000 | Hauser et al. | |
| 6,151,589 A | 11/2000 | Aggarwal et al. | |
| 6,161,099 A | 12/2000 | Harrington et al. | |
| 6,167,384 A | 12/2000 | Graff | |
| 6,202,051 B1 | 3/2001 | Woolston | |
| 6,243,691 B1 | 6/2001 | Fisher et al. | |
| 6,266,652 B1 | 7/2001 | Godin et al. | |
| 6,269,395 B1 | 7/2001 | Blatherwick et al. | |
| 6,292,788 B1 | 9/2001 | Roberts et al. | |
| 6,298,333 B1 | 10/2001 | Manzi et al. | |
| 6,347,302 B1 | 2/2002 | Joao | |
| 6,381,587 B1 | 4/2002 | Guzelsu | |
| 6,385,730 B2 | 5/2002 | Garrison | |
| 6,397,337 B1 | 5/2002 | Garrett et al. | |
| 6,397,356 B1 | 5/2002 | Yonezawa | |
| 6,430,488 B1 | 8/2002 | Goldman et al. | |
| 6,449,601 B1 | 9/2002 | Friedland et al. | |
| 6,470,324 B1 | 10/2002 | Brown et al. | |
| 6,480,854 B1 | 11/2002 | Gross et al. | |
| 6,502,080 B1 * | 12/2002 | Eichorst et al. | 705/400 |
| 6,529,952 B1 | 3/2003 | Blumenau | |
| 6,539,482 B1 | 3/2003 | Blanco et al. | |
| 6,560,580 B1 | 5/2003 | Fraser et al. | |
| 6,606,608 B1 | 8/2003 | Bezos et al. | |
| 6,609,108 B1 * | 8/2003 | Pulliam et al. | 705/27 |
| 6,611,728 B1 | 8/2003 | Morioka et al. | |
| 6,622,129 B1 | 9/2003 | Whitworth | |
| 6,678,731 B1 | 1/2004 | Howard et al. | |
| 6,694,365 B1 | 2/2004 | Wyngarden | |
| 6,697,806 B1 | 2/2004 | Cook | |
| 6,725,201 B2 | 4/2004 | Joao | |
| 6,735,573 B1 | 5/2004 | Gelman et al. | |
| 6,745,225 B2 | 6/2004 | Loh et al. | |
| 6,751,546 B2 | 6/2004 | Yamashita | |
| 6,754,564 B2 | 6/2004 | Newport | |
| 6,768,935 B1 | 7/2004 | Morgan et al. | |
| 6,785,658 B1 | 8/2004 | Merker et al. | |
| 6,813,612 B1 | 11/2004 | Rabenold et al. | |
| 6,819,218 B2 | 11/2004 | Mabuchi et al. | |
| 6,865,566 B2 | 3/2005 | Serrano-Morales et al. | |
| 6,920,433 B1 | 7/2005 | Seretti et al. | |
| 6,980,963 B1 * | 12/2005 | Hanzek | 705/26 |
| 7,103,568 B1 | 9/2006 | Fusz et al. | |
| 7,363,246 B1 | 4/2008 | Van Horn et al. | |
| 7,409,361 B2 | 8/2008 | Dinwoodie | |
| 7,430,517 B1 | 9/2008 | Barton | |
| 7,480,550 B2 | 1/2009 | Huber et al. | |
| 7,908,180 B2 | 3/2011 | Goclowski | |
| 7,921,052 B2 * | 4/2011 | Dabney et al. | 705/37 |
| 2001/0044751 A1 | 11/2001 | Pugliese et al. | |
| 2001/0056396 A1 | 12/2001 | Goino | |
| 2002/0002475 A1 | 1/2002 | Freedman | |
| 2002/0023537 A1 | 2/2002 | Ridgeway et al. | |
| 2002/0049663 A1 | 4/2002 | Kahana et al. | |
| 2002/0082978 A1 | 6/2002 | Ghouri et al. | |
| 2002/0111877 A1 | 8/2002 | Nelson | |
| 2002/0143646 A1 | 10/2002 | Boyden et al. | |
| 2002/0186144 A1 | 12/2002 | Meunier | |
| 2003/0004806 A1 | 1/2003 | Vaitekunas | |
| 2003/0036964 A1 | 2/2003 | Boyden et al. | |
| 2003/0120509 A1 * | 6/2003 | Bruch et al. | 705/1 |
| 2003/0130952 A1 | 7/2003 | Bell et al. | |
| 2003/0158806 A1 | 8/2003 | Hanley et al. | |
| 2003/0191581 A1 * | 10/2003 | Ukai et al. | 701/207 |
| 2004/0107160 A1 | 6/2004 | Goclowski | |
| 2004/0117293 A1 | 6/2004 | Lammle et al. | |
| 2004/0128224 A1 | 7/2004 | Dabney et al. | |
| 2004/0172266 A1 | 9/2004 | Sheinson et al. | |
| 2005/0021444 A1 | 1/2005 | Bauer et al. | |
| 2005/0038758 A1 | 2/2005 | Hilbush et al. | |
| 2005/0065853 A1 | 3/2005 | Ferreira | |
| 2005/0080712 A1 | 4/2005 | Bauer et al. | |
| 2005/0125330 A1 | 6/2005 | Dinwoodie | |
| 2005/0228736 A1 | 10/2005 | Norman et al. | |
| 2005/0256780 A1 | 11/2005 | Eldred | |
| 2006/0074790 A1 * | 4/2006 | Anspach | 705/35 |
| 2006/0206408 A1 | 9/2006 | Nassiri | |
| 2006/0265235 A1 * | 11/2006 | Schuchardt et al. | 705/1 |
| 2007/0179860 A1 | 8/2007 | Romero | |
| 2007/0226081 A1 | 9/2007 | Vilcauskas et al. | |
| 2008/0300962 A1 | 12/2008 | Cawston et al. | |
| 2009/0048942 A1 | 2/2009 | Bouwens et al. | |

OTHER PUBLICATIONS

Form PCT/ISA/220, PCT/US06/27088, "PCT Notification of Transmittal of the International Search Report and the Written Opinion of the International Searching Authority, or the Declaration," 1 pg.

Form PCT/ISA/210, PCT/US06/27088, "PCT International Search Report," 2 pgs.

Form PCT/ISA/237, PCT/US06/27088, "PCT Written Opinion of the International Searching Authority," 4 pgs.

Form PCT/IB/373, PCT/US06/27088, "PCT International Preliminary Report on Patentability," 1 pg.

Collins English Dictionary, Harper Collins Publishing 2000.

UPS Domestic Delivery Area Surcharge: http://web.archive.org/web/20050404012352/www.ups.com/content/us/en/shipping/cost/zones/on_demand.html (dated Apr. 4, 2005; Domestic Delivery Area Surcharge Chart dated Jan. 3, 2005) [retrieved from Internet Archive on Dec. 14, 2009].

UPS Payment Methods: http://web.archive.org/web/20050519002823/www.ups.com/content/us/en/resources/pay/methods.html (dated May 19, 2005) [retrieved from Internet Archive on Dec. 15, 2009].

PCT/US10/37797; PCT/ISA/220 "Notification of Transmittal of the International Search Report and the Written Opinion of the International Searching Authority, or the Declaration," 1 pg.

PCT/US10/37797; PCT/ISA/210 "International Search Report," 2 pgs.

PCT/US10/37797; PCT/ISA/237 "Written Opinion of the International Searching Authority," 5 pgs.

Form PCT/ISA/220, PCT/US10/25759, "PCT Notification of Transmittal of the International Search Report and the Written Opinion of the International Searching Authority, or the Declaration," 1 pg.

Form PCT/ISA/210, PCT/US10/25759, "PCT International Search Report," 2 pgs.

Form PCT/ISA/237, PCT/US10/25759, "PCT Written Opinion of the International Searching Authority," 8 pgs.

* cited by examiner

| HOME | VEHICLE PROCESSING | FIND VEHICLES | HELP | LOGOUT

Reporting
-Purchase Reports
-All Vehicle Returns
-Maturity Optimizer

Pre-Sales Questions
Post-Sales Questions
Terms & Conditions
Arbitration Rules

MATURITY OPTIMIZER

Description of how to begin the search process. Description of how to begin the search process...

Choose type of account:
[Lease ▽] — 21

Choose approval type:
[Pre-approved ▽] — 22

Choose condition report status:
[Without Condition Reports ▽] — 23

Maturities Date Range:
From: [09/01/2004]   To: [09/31/2004] — 24

Model Years:
From: [2003]   To: [2003] — 25

Choose model types:
| All Models △ |
| Altima |
| Maxima |
| Pathfinder ▽ |
— 26

Choose customer intent:
| All Intents |
| Customer Intends to Purchase Vehicle |
| Customer Intends to Purchase New Vehicle |
— 27

28 — ☐ Omit Customers on the Do Not Call list

[Submit]  [Reset]

Figure 2

Reporting
-Purchase Reports
-All Vehicle Returns
-Maturity Optimizer

Pre-Sales Questions
Post-Sales Questions
Terms & Conditions
Arbitration Rules

HOME | VEHICLE PROCESSING | FIND VEHICLES | HELP | LOGOUT

Maturity Optimizer Search Results

Vehicle Detail- 🔲
Condition Report with Images- 📷
Condition Report- 🗎

Total Vehicles Found : 4
Show: (25 50 100) at a time
Show all record details

Sort by | VIN∧∨ | Year∧∨ | Make∧∨ | Model∧∨ | Mileage∧∨ | Color∧∨ | Maturity∧∨ |
Last Name ∧∨

31

1-4(of 4)

32a — 1. 2002 Nissan Xterra XE Wagon    VIN: 5N1ED28Y84C605030    Color: Metallic Silver
         Nakamura, Craig                  Maturity Date: 05/19/2004    Inspected? No
         ▸ Show Detailed Record                                        Add to Watchlist ☐

32b — 2. 2002 Nissan Xterra XE Wagon    VIN: 5N1ED28Y84C605030    Color: Metallic Silver
         Nakamura, Craig                  Maturity Date: 05/19/2004    Inspected? No
         ▸ Show Detailed Record                                        Add to Watchlist ☐

32c — 3. 2002 Nissan Maxima SE Sedan   VIN: 1N4BA41E44C850375    Color: Gold
         Anne, Frank                      Maturity Date: 05/19/2001    Inspected? No
         ▼ Hide Detailed Record 32d — 482 Park St., Birmingham, AL 48009
      Work: (123) 456-7890 ☎                             Home: (123) 456-7890
      Acct: XXX-XX-XXXXX        MSRP: $18294.21   Mthy PMT/Sec Dep: $426.41/$0.00
      Adj Mat Date: 05/19/2001  Cap Cost:   $415.27      Est GPO/APR: $416.21/5.9%
      Good Thru: 06/22/2004  Pre Apr Pmt Amt:  $372.48   Pre Apr #: 3287238720RHT 342

Pre-Approval Type: Lease   Account Type: Individual  Term/Rem/Cont Mile: 36/0/36000

Customer Intent: Lessee Intends to Purchase Vehicle         ( Update Intent )

Add to Watchlist ☐
                     ╱35                                                 ╱
Download Results                                                       34

( View Watchlist )    | The user will have the      ( Update Watchlist )
                      | ability to download the
                      | results to an Excel file
                      | by clicking this button

Figure 3

Reporting
-Purchase Reports
-All Vehicle Returns
-Maturity Optimizer

Pre-Sales Questions
Post-Sales Questions
Terms & Conditions
Arbitration Rules

HOME | VEHICLE PROCESSING | FIND VEHICLES | HELP | LOGOUT

Maturity Optimizer Search Results        35 ⟶ Vehicle Detail- ▣
                                            Condition Report with Images- ▦
Total Vehicles Found : 4                    Condition Report- ✉
Show: (25 50 100) at a time.
Show all record details
Sort by | VIN∿ | Year∿ | Make∿ | Model∿ | Mileage∿ | Color∿ | Maturity∿ |
         ╱                           Last Name ∿
        31                                                          1-4(of 4)

32a ╱  1. 2002 Nissan Altima S Sedan    VIN: 1N4AL11D34C177770    Acct #: 762346920498234
        Craig Nakamura  1112 Golden Gate Ct. Las Vegas, NV 89144  (123) 456-7890/(123) 456-7890

▸ Show Detailed Record                                Add to Watchlist ☐

32b ╱  2. 2002 Nissan Altima S Sedan    VIN: 1N4AL11D34C177770    Acct #: 762346920498234
        Craig Nakamura  1112 Golden Gate Ct. Las Vegas, NV 89144  (123) 456-7890/(123) 456-7890

▸ Show Detailed Record                                Add to Watchlist ☐

32c ╱  3. 2002 Nissan Xterra XE Wagon   VIN: 5N1ED28Y84C605030    Acct #: 762346435232435
        Craig Nakamura  1112 Golden Gate Ct. Las Vegas, NV 89144  (123) 456-7890/(123) 456-7890

▾ Hide Detailed Record

Start Date: 05/19/2001      Loan Amt: $18129.21    Mthy PMT: $426.41
        Maturity Date: 05/19/2004   Loan Balance: $415.27  Est GPO/APR: $416.21/5.9%
32d ╱   Good Thru: 07/05/2004  Pre Apr Pmt Amt: $533.01   Pre Apr #: 3287238720RHT 342

Pre-Approval Type: Retail   Account Type: individual

Add to Watchlist ☐
                                                                      ╱
                                                                    34

( View Watchlist )                              ( Update Watchlist )

Figure 4

Reporting
-Purchase Reports
-All Vehicle Returns
-Maturity Optimizer

Pre-Sales Questions
Post-Sales Questions
Terms & Conditions
Arbitration Rules

---

| HOME | VEHICLE PROCESSING | FIND VEHICLES | HELP | LOGOUT |

Update Customer Intent — 41

2002 Nissan Maxima SE Sedan   Name: Anne Frank
VIN: 1N4BA41E44C850375   Address: 482 Park St., Birmingham, AL 48009
Acct #: 762346435232435   Home/Work: (123) 456-7890/(123) 456-7890 ⊘

Maturity Date: 05/19/2001   MSRP: $18294.21  Mthy PMT/Sec Dep: $426.41/$0.00
Adj Mat Date: 05/19/2001   Cap Cost: $415.27   Est GPO/APR: $416.21/5.9%
Good Thru: 06/22/2004  Pre Apr Pmt Amt: $372.48   Pre Apr #: 3287238720RHT 342

Pre-Approval Type: Lease  Account Type: Individual  Term/Rem/Cont Mile: 36/0/36000

---

Customer Intent Information: — 42
Current Intent Information:
Customer Intends to Purchase New Vehicle updated on 3/25/2004 by Bill Johnson

| Prior Intent | Date Updated | By |
|---|---|---|
| Customer Returning Vehicle ON 3/24/2004 | 3/21/2004 | Zach Hollowell |
| Customer Undecided | 3/20/04 | Ed Laroche |

Update Customer Intent:
Please use the fields below to update any new or changed information regarding the lessee or dealer.

Vehicle's Current Mileage [ ]

Customer intends to purchase current vehicle
○ YES   ○ NO   ○ Not Sure/Undecided

Customer's Estimated Return Date [ ] (enter date)

Dealer Intends to Purchase Vehicle
○ YES   ○ NO   ○ Not Sure/Undecided

Pre-return inspection has been scheduled by lessee
○ YES   ○ NO   (If No, please refer the customer to the Nissan Lease Customer Network)

Customer is interested in purchasing a new vehicle (select model)
[ Infinity QX ▼ ]

Preferred Customer Contact Number [ ] - [ ]

Customer's E-mail Address [ ]
— 43

Note
[ ]

( Update )

---

*Side note (left):* The customer and pre-approval information would display here:

Up until the point the vehicle is returned, the dealer would be able to indicate the customer's intent for return, purchase of the leased vehicle or new vehicle after return.

The "history" of customer intents would be recorded on this page.

The user would then be able to update the current intent here

*Side note (right):* Manufacturer will send a customer intent record in the 280 day file, which would display in the intent list, with the "by" being "Manufacturer" (Login_id=xxxxx).

If the Manufacturer intent is the most recent, it would display as the "Current Customer Intent"

Figure 5

SYSTEMS AND METHODS FOR VEHICLE LIFECYCLE MANAGEMENT

CROSS-REFERENCE

This application claims the benefit of U.S. Provisional Application No. 60/781,166, filed Mar. 10, 2006, which application is incorporated herein by reference.

This application is related to patent application Ser. No. 11/685,121 (now U.S. Pat. No. 8,095,422) for Systems And Methods For Vehicle Information Management, invented by Zachary Emerson Hallowell and Clarence Joseph Hammond, filed concurrently herewith, which application is incorporated herein by reference.

BACKGROUND OF THE INVENTION

Organizations are called upon to manage inventories of vehicles. The inventories may include, for example, vehicles under lease agreements. Considerable amounts are invested in the inventories, and considerable attention may be involved in managing the vehicles. Accordingly, there is a need for improved methods and systems relative to computer-assisted vehicle inventory management.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

FIG. 2 is a diagram of a user interface for maturities searching, according to an embodiment of the invention.

FIG. 3 is a diagram of a user interface for search results, according to an embodiment of the invention.

FIG. 4 is a diagram of a user interface for search results for accounts, according to an embodiment of the invention.

FIG. 5 is a diagram of a user interface for customer intent tracking, according to an embodiment of the invention.

DETAILED DESCRIPTION OF THE INVENTION

Figure 1:
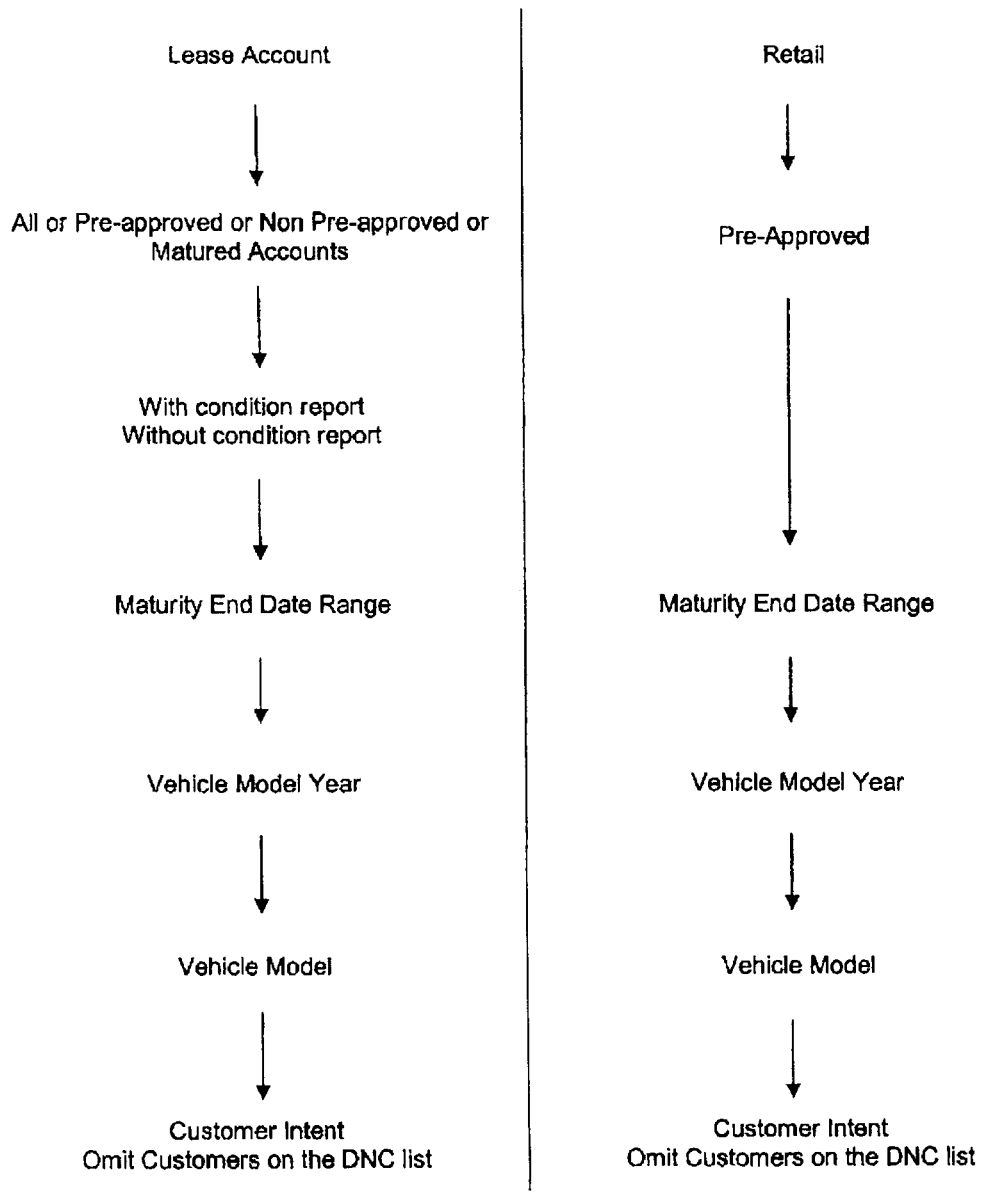
FIG. 1 is a hierarchy diagram, according to an embodiment of the invention.
Figure 6:
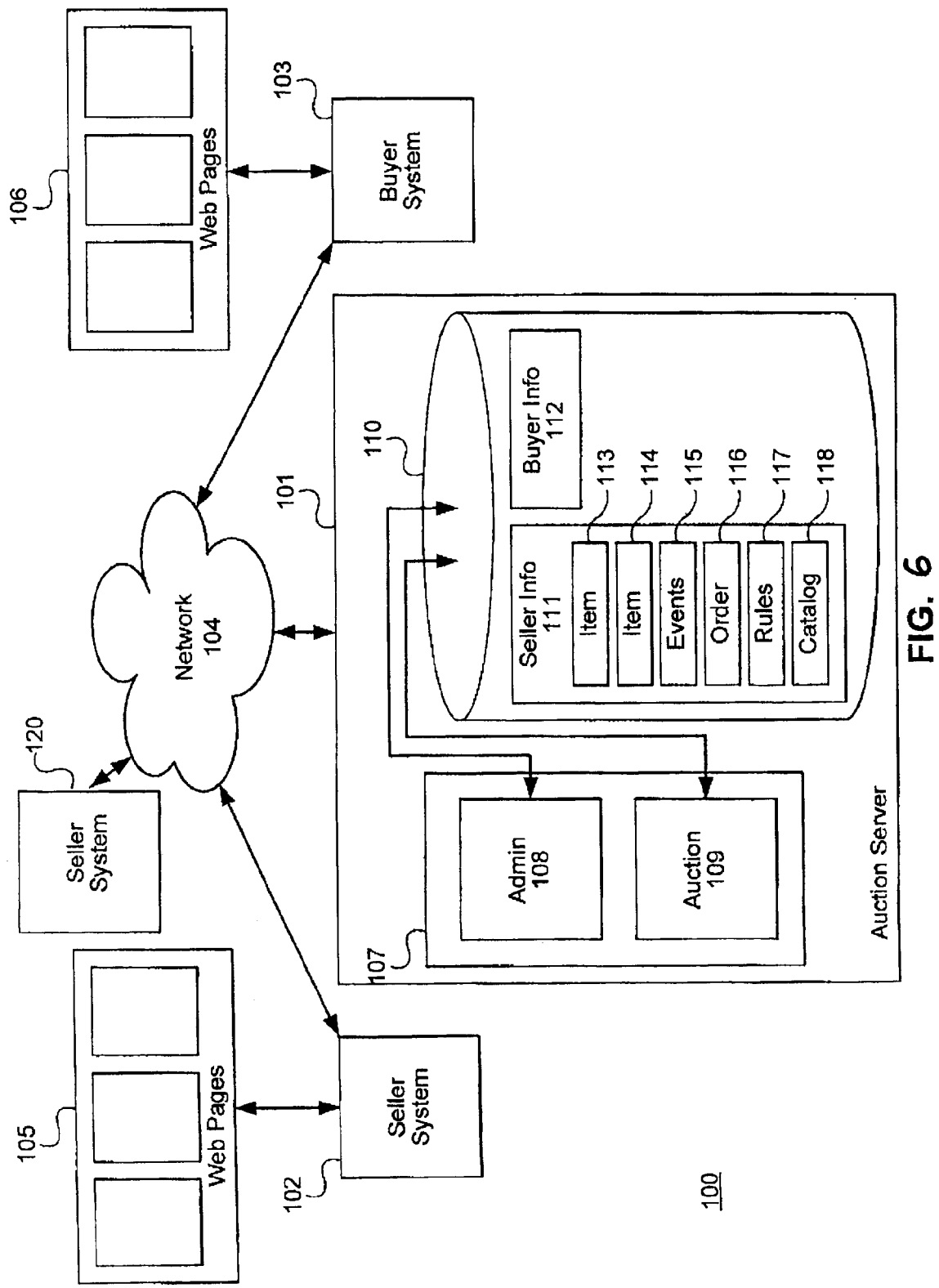
FIG. 6 is a block diagram of a system with a bidding tool, according to an embodiment of the invention.
Figure 7:
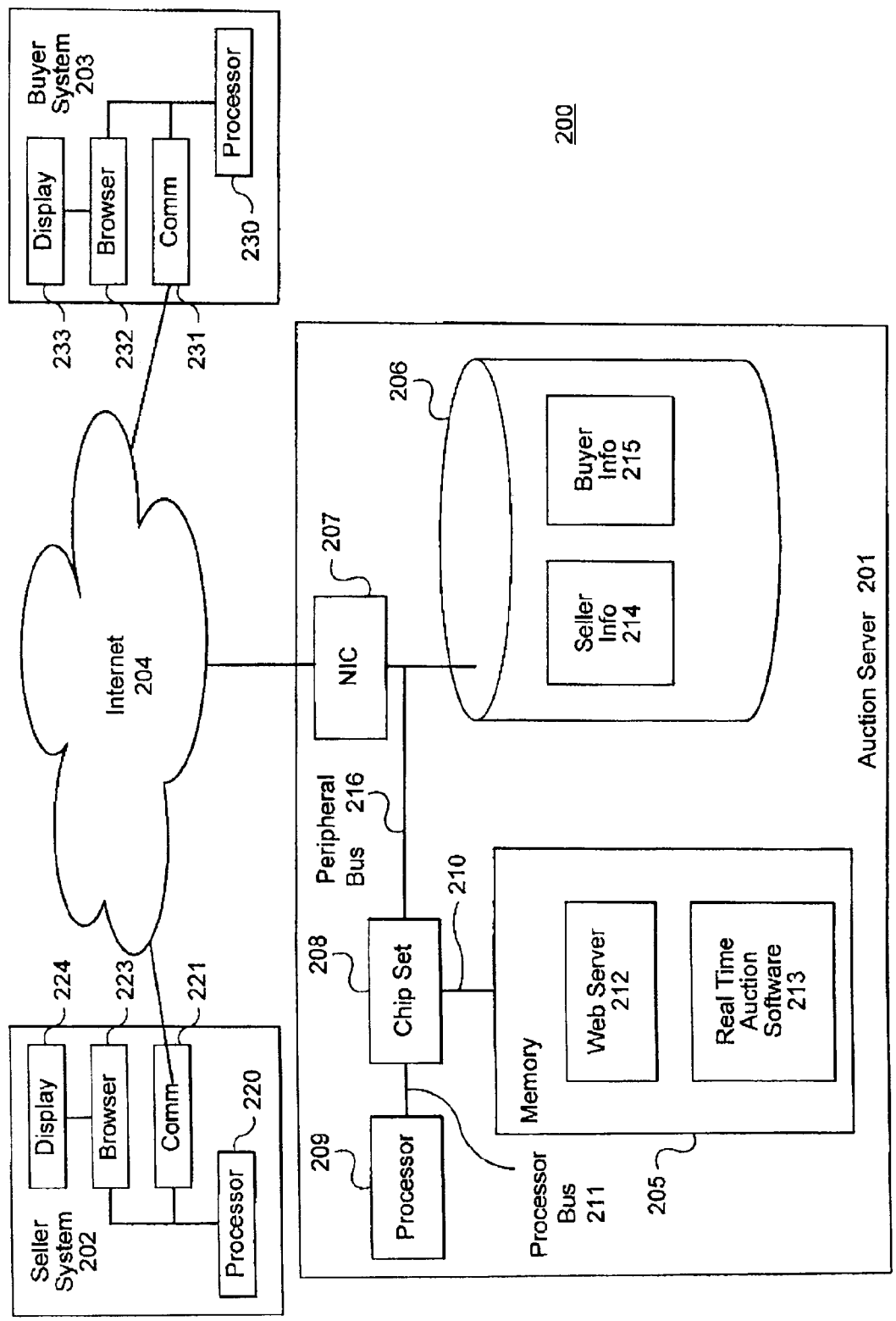
FIG. 7 is a more detailed block diagram of a system with a bidding tool, according to an embodiment of the invention.

While preferred embodiments of the present invention have been shown and described herein, embodiments are provided by way of example only. Numerous variations, changes, and substitutions are possible without departing from the invention. It should be understood that various alternatives to the embodiments of the invention described herein may be employed in practicing the invention.

Embodiments of the invention are directed to methods and systems for managing inventories of vehicles. Embodiments are directed to managing the lifecycle, including sale, of sets of used vehicles. The vehicles may be managed by members of a wholesale community of dealers, and presented for sale within such community. An embodiment of the system allows for the viewing of vehicle inventory information, the registration of a return of the vehicle, the offering of the vehicle for sale to one or more various groups of wholesale buyers and potential consignment to a transporter. An embodiment of the system also supports the association of electronic inspections with and the display of, inspection information.

An embodiment of the invention may be directed to a system that stores information about a set of vehicles and allows users to view information about the vehicles. Access to the information may be controlled so that various individuals and/or organizations have different access to the information. The information may be provided to parties other than the owners of the vehicles in order to facilitate sale of the vehicles. For example, according to an embodiment, information regarding vehicles in a fleet that includes rental vehicles may be provided to various other dealers. This may in turn facilitate sale of vehicles. As a result, according to some embodiments, information regarding the vehicles is moved electronically to facilitate sale, which can help to avoid some of the physical movement of the vehicles in the sales process.

Electronic notifications may be provided to various systems and users upon events in the life cycle of the vehicles. This information may include, for example, notification that a vehicle has been returned in connection with a lease or rental. The notifications may be provided to the organization that owns the vehicle, or other organization or organizations. Information regarding vehicles may be offered exclusively to a particular organization or organizations. For example, information regarding vehicles may be offered exclusively to the grounding dealer. A grounding dealer is the dealer to which a vehicle is turned in by the user (e.g., upon conclusion of lease or rental contract), and is also referred to the turn-in dealer. The electronic information regarding vehicles may include details regarding the physical aspects of the vehicle, such as make, model, and configuration. The electronic information regarding vehicles may also or alternatively include details regarding the contractual arrangements related to the vehicle and/or customer or user of the vehicle. Thus, customer account information may be maintained and made available by the system to a user or various users.

The embodiments may be implemented in systems, such as network-based systems, and/or in methods, such as computer software methods. Embodiments may include combinations of systems and processes.

Various embodiments may include processes and/or systems having the following features in whole, in part, or in various combinations:

Vehicle is loaded into an electronic system as data (for example, as inventory data)
  Data is accessible by designated users (such as sellers) at any point from the vehicle being loaded into the database via a personal computer
  Vehicle description and accessory information is displayed (the description may include year, make, model, series, engine, transmission, drivetrain, mileage (odometer), photographs)
  Seller may manually set prices via a web interface
  Seller may choose to accelerate the vehicles lifecycle and release the vehicle for sale to buyers
Maturity manager—users associated with the vehicle (seller, originator of lease or rental contract, potential buyers) may access and view the vehicle information and aspects of the vehicle's lifecycle.
  Users have a search function to allow them to search for a specific vehicle or group of vehicles Users can view vehicle information and, if a lease vehicle, may indicate the customer's intent to purchase, or not purchase, the vehicle at end of contract to lease/rent the vehicle Vehicle return manager Upon the end of the vehicle's lease contract, the customer will return the vehicle to a location.

A user associated with the location will record the return in the system, which will update the vehicle's status to either be available for sale to users associated with the grounding location (provided specific parameters are met) or will move the vehicle to a non-purchasable status. The return includes entering and recording information regarding the vehicle such as return date, final mileage, indication of condition.

The vehicle's location, final mileage and responses to questions asked during the return process will be stored in a database.

A vehicle return receipt will be generated which will be printable and may contain an electronic signature. An electronic message version of the receipt may be generated, for example as an e-mail.

Exclusive grounding location availability

Upon completion of vehicle return, the vehicle may be offered for online purchase to a user associated with the grounding location of the vehicle The user(s) will have an exclusive period in which to view the vehicle and decide whether or not to purchase.

The user may indicate that they do not want to purchase the vehicle, which will accelerate the vehicle's availability to other users. For example, after receipt of the indication, the vehicle may be made available immediately for purchase by other users.

Non-grounding, affiliated user availability

Upon expiration of the exclusive grounding location availability period, the vehicle will be made available on a web-site for sale to a group of affiliated dealers, who have a contractual relationship with the seller of the vehicle.

The vehicle will continue to be available to the grounding location's user during this period.

Consignment

An electronic notification may be sent to a transporter for vehicles that do not sell.

Data transmissions

Vehicle status updates will be transmitted electronically to the vehicle owner.

An embodiment of the invention is directed to an online system allowing an automobile dealership to track the status of vehicles and corresponding lease or retail loan customer accounts for which they have been assigned or assumed responsibility from the financing company.

An embodiment may be password protected and provided in a network-deployed system (such as a web-deployed system). Various embodiments may include in whole, in part, or in various combinations:

A set of data, stored in a database, composed of vehicle information and user lease or retail account information. Within the data may be an indicator of whether the customer is pre-approved for reduced rate financing and whether the customer is on the federal, state or corporate do not call lists.

A username and password protected login screen, presented in a web browser or similar mechanism.

A set of rules governing the relationship between the user and the vehicle and customer data to be retrieved.

A set of rules governing the vehicle and account data to be displayed.

An account search page, where the user can adjust controls related to defining a set of data to be returned in search results.

A search results page, containing summary vehicle and account information, which can be downloaded in multiple formats. The result set would be governed by the rules applicable to the user, account and vehicle.

An account information page, on which detailed customer and vehicle information is displayed, containing a set of controls for storing the customer intent.

For both maturing and past-maturity leases, an embodiment may include a hierarchy of rules that define which dealership(s) may view the lease account information. Dealers lower in the hierarchy may view limited or no information. For example, the levels may include:

Preferred dealer (occurs when a lessee notifies the lessor that they would like to turn-in or patronize a dealership other than their originating dealer, for example in the case of disputes with their current or originating dealer)

Originating dealer (where the lessee leased the car from). If there is no preferred dealer, the user may be displayed to the originating dealer Non-originating, non-preferred dealer—may not view the vehicle or account information in the maturity manager.

For example, if the service provider receives records for a particular vehicle reaching maturity that indicates that the vehicle has both an originating dealer and a preferred dealer, only the preferred dealer will be able to view the upcoming maturity in the system.

FIG. 1 is a hierarchy diagram, according to an embodiment of the invention. According to an embodiment, vehicles will only become visible through the maturity manager when the account and vehicle information pass specific rules, provided by the finance company. Thus, for accounts for leased vehicles, according to various levels of permissions, accounts for vehicles may be visible for all accounts, or for accounts depending on: whether there is a condition report, the maturity date of the underlying contract or other arrangement (for example, whether the current date or time is within a particular date or time range as compared to the maturity date), vehicle model year, vehicle model and/or customer intent (including whether the customer is on a do not call list or database). Visibility of accounts may depend on whether the accounts are approved or not pre-approved. According to an embodiment, the rules are provided by a finance company, such as the finance company that provides the financing for the respective vehicle.

FIG. 2 is a diagram of a user interface for maturities searching, according to an embodiment of the invention. The interface may include user options to search based on type of account 21, approval type 22, condition report status 23, maturities date range 24, model years 25, model types 26, customer intent 27, and omitting customers on the do not call list 28. The system uses the various choices from these inputs to search for respective accounts and/or vehicles. For example, the type of account may be lease, rental, or loan, and the approval type may be pre-approved or not pre-approved. The condition report status 23 may include the option to search based on whether the vehicle has a condition report, or to search for vehicles without condition reports, or based on the condition report. The maturities date range 24 allows for entry of ranges of dates in which the respective agreement or other arrangement matures, and to cause a search to occur based on the respective range. Model years 25 may also be a range of a from and a to model year on which the search may be based. Model types 26 may include models selectable from a list of models, or series, or other vehicle types. Customer intent 27 may include all intents, whether the customer intends to purchase a new vehicle, and/or other intent. The option to omit customers on the do not call list may be a binary option, such as a check box that simply indicates that the system is to omit customers on the do not call list. Pre-approval may refer to whether the customer is pre-approved for financing of another vehicle transaction (such as purchase or lease) and the amount of financing for which such customer is pre-approved.

FIG. 3 is a diagram of a user interface for search results, according to an embodiment of the invention. The system shows respective accounts and/or vehicles in response to a search request. Different fields may be displayed based on the different type of accounts the dealer was reviewing. For example, the fields may be different depending on whether the accounts were for retail accounts versus lease accounts, and whether the accounts were pre-approved or not pre-approved. The accounts may have customer intent information, which may be updated as appropriate. Non pre-approved accounts may be displayed in the same fields as pre-approved accounts, but may indicate n/a or other designation to the extent that the respective data does not apply. Accounts that were on a do not call list may have an indication such as an icon indicating that they are on such a list.

The interface may include items such as sort criteria 31, and accounts provided in response to the search, such as accounts 32a, 32b, and 32c. Accounts may be shown in the short format without detail, such as accounts 32a and 32b shown here, or with more detailed record, such as account 32c, which includes detailed information 32d. This detailed information may include items such as the type and year of the vehicle, the VIN, the account person's name, and/or maturity date, while the more detailed information may include information such as the address, telephone numbers, MSRP, adjusted maturity date, capital costs, and other detailed information as shown, which may be provided in various combinations or sub-combinations. The interface may include an option to add the vehicle to a watch list 34. Additionally, the interface may include an option to download the results, such as to a external file, such as an Excel file by making the appropriate selection. Search results may be sorted, such as shown here with option 31, by criteria such as VIN, year, make, model, mileage, color, maturity, name, or other criteria.

Various embodiments of the invention may include the following, or various subsets of combinations thereof in search functionality, for example, associated with a maturity manager:

The search may look for all vehicles prior to return, provided they meet the visibility rules outlined above.
  If a single vehicle was returned, then the user is taken to a update customer intent page.
  Customer contact information will be scrubbed against the do not call lists. The system shows the contact information but indicates the do not call status with an icon.
  Dealer sees grounded vehicles via a link to grounded vehicles.
  For the retail pre-approved report, if the good through date is less than the system date, then the retail vehicles are not displayed.

FIG. 4 is a diagram of a user interface for search results for retail accounts, according to an embodiment of the invention. The interface may include options to sort by various criteria 31, and search results 32a, 32b, and 32c. The interface may also include the option to add respective items to a watchlist 34. The interface may include options to provide vehicle detail, provide a condition report with images, and/or provide a condition report 35. Detailed information may be provided for respective search results, as shown here detailed information 32d that corresponds to search result 32c.

According to various embodiments of the invention, certain information stored in the system may be downloaded to certain users. This information may be downloaded according to various formats, for example, .csv (or .pdf) formats. Such downloadable fields may include the following, or subsets thereof, or various combinations or subcombinations thereof:

For lease pre-approved, or non pre-approved accounts,
  VIN
  Year, make, model, series
  Color
  Lessee first name, lessee last name
  Maturity date
  Address 1, city, state, zip
  Home telephone number
  Work telephone number
  Lease account number
  Adjusted maturity date
  Good through date
  MSRP
  Cap cost
  Pre-approval amount
  Monthly payment
  Security deposit
  Estimated GPO
  APR
  Pre-approval number
  Pre-approval type
  Account type
  Term
  Remaining months
  Contract mileage
  For Retail pre-approved accounts,
  VIN
  Year, make, model, series
  Lease account number
  Lessee first name, lessee last name
  Address 1, city, state, zip
  Home telephone number
  Work telephone number
  Start date
  Maturity date
  Good through date
  Loan amount
  Loan balance
  Pre-approval amount
  Monthly payment
  Estimated GPO
  APR
  Pre-approval number
  Pre-approval type
  Account type FIG. 5 is a diagram of a user interface for customer intent tracking, according to an embodiment of the invention. The interface may include customer account information 41, customer intent information 42, and update inputs 43. The customer account information may include information about the vehicle and the respective arrangement regarding the vehicle. The information regarding the vehicle may include various items of information regarding the vehicle, such as the model, year, make, series, VIN, account number. The information regarding the customer may include the customer name, address, telephone numbers. The information regarding the arrangement may include information regarding a financial or lease arrangement regarding the vehicle. This information regarding the arrangement may include items such as maturity date, adjusted maturity date, price, capital cost, monthly payment, GPO/APR, and/or other information regarding the customer account. Customer intent information may include information regarding when the customer intends to purchase a vehicle. The information may include a date or other time related information regarding when the information was updated and an indication of the user that updated the information. Additionally, prior intent may be stored and displayed.

The update 43 for customer intent may include various fields or other methods of entry that allow for the customer's intent or related information to be entered. For example, the customer intent update 43 may include current vehicle mileage, whether the customer intends to purchase the current vehicle, the customer's estimated return date, whether the dealer intends to purchase the vehicle, whether a pre-inspection has been scheduled (for example, by the lessee), whether the customer is interested in purchasing a new vehicle, the customer's contact number, the customer's email address and notes. The input regarding whether the customer intends to purchase a new vehicle may include information regarding the vehicle that the customer is intending to purchase, for example, the type of vehicle. Other information regarding the purchase may also be included, according to various embodiments of the invention.

FIG. 100 is a block diagram of a system with a bidding tool, according to an embodiment of the invention. Other tools and network configurations may be used according to other embodiments of the invention. The system shown includes an auction server 101, seller system 102, seller system 120, and buyer system 103. Also shown is network 104. Seller system 102 includes web pages 105, and buyer system 103 includes web pages 106. Auction server 101 includes software 107 and storage 110. Software 107 includes administrative software 108 and auction software 109, and storage includes seller information 111 and buyer information 112. Seller information 111 includes information such as vehicle information 113 and 114, and events information 115 which includes order 116, rules 117 and catalog 118. Auction server 101 is coupled to seller system 102 and buyer system 103 via network 104. Software 107 in auction server 101 operates with storage 110.

Seller system 102 includes functionality to manage inventory (such as vehicles), set up and modify bidding events, and manage bidding events. Such functionality may be included directly in seller system 102 or may be included in auction server 101 or in a combination of software or other logic located in seller system 102 and auction server 101.

Buyer system 103 includes functionality to view catalog items for bidding, to place bids and view an auction, and to select purchase, payment and delivery options for items purchased. This functionality may be included in functionality on buyer system 103, auction server 101 and/or combination of functionality located on auction server 101 and buyer system 103. The functionality may be implemented in software, hardware, or a combination of hardware and software according to various embodiments. Thus, according to various embodiments, the implementations described herein for software may also be implemented in various configurations of software and/or hardware, in distributed or other configurations in various machines and/or networks.

Auction server 101 includes software and storage to manage options and the users of the auctions. Administrative software 108 manages users and information related to users, such as seller information 111 and buyer information 112. Auction software 109 controls an auction including the progress of the auction as requested by seller system 102 and response to bids made by buyer system 103.

Seller system 102 includes web pages 105 that allow seller to enter and display information regarding auction events, inventory, and related administration.

Buyer system 103 includes web pages 106 that allow a buyer to display information regarding bidding as well as enter information commands in order to participate in bidding in auctions.

FIG. 200 is a more detailed block diagram of a system with a bidding tool, according to an embodiment of the invention. Other tools and network configurations may be used according to other embodiments of the invention. In the system 200 shown are auction server 201, seller system 202, and buyer system 203. Auction server 201 is coupled to seller system 202 and buyer system 203 through Internet 204. FIG. 200 shows a more detailed view of architecture of the various components of the auction system. Auction server 201 may include a processor 209 for processing instructions, such as an Intel Pentium™ processor, AMD Athlon™ processor or other processor. Processor 209 is coupled to chip set 208 by a processor bus 211. Chip set 208 is coupled to memory 205 by a memory bus 210 and manages access to memory 205 by processor 209. Chip set 208 is also coupled to peripheral bus 216. Peripheral 216 bus may comprise, for example, PCI, PCI-X, PCI Express, or other peripheral bus. Auction server 201 also includes one or more network interface cards 207 coupled to peripheral bus 216 for providing network interfaces to network, such as Internet 204. Storage 206, such as a disk array or other non-voltage storage, is also coupled to peripheral bus 216.

According to various embodiments, memory 205 and/or storage 206 may include various forms of storage or computer-readable memories such as, but not limited to, volatile memory (random access memory ("RAM"), non-volatile memory (read-only memory ("ROM")), EEPROM, disk, and/or other storage devices that may include one or more of magnetic, optical storage, or other media. The memory and/or storage on the auction server may be configured as a RAID (Redundant Array of Independent Disks) configuration to provide high reliability access to software and data.

Software may be loaded into memory 205 to help provide auction/bidding function for auction server 201. For example, web server 212 and real-time auction software 213 may be loaded into memory 205 and run by processor 209. Web server 212 provides web pages for the users to interact with in order to be provided with auctions/bidding functions. For example, web server 212 may serve up web pages to seller system 202 and buyer system 203 in order to allow seller system 202 to manage inventory events and bidding and to allow buyer system 203 to view events and auction items to make bids and to participate in auctions. Storage 206 includes information about respective users, such as seller information 214 and buyer information 215. This information is used in order to manage the inventory of items for sale, configuration of bidding events, and the processing of real-time bidding. According to various embodiments of the invention, auction system 200 may include one or a plurality of auction servers 201 in various configurations and architectures to provide auctions and bidding functionality.

Seller system 202 and/or buyer system 203 may comprise computer systems coupled to a network such as Internet 204 according to an embodiment. As shown, seller system 202 includes processor 220 and software components such as a browser 223 and communications software 221. Also included is a display 224 that allows a user to see information regarding auctions and to perform related administration. Buyer system 203 also includes a processor 230, communication software 231, browser 232, and display 233. Various browser software or other software or functionality to provide user interaction may be used in buyer and seller systems. For example, browsers may include, but are not limited to, Internet Explorer, Netscape browser, Firefox browser, Safari browser or other browser. Alternatively, other user interface software not including a browser may be used.

Software such as web server 212 and real-time auction software 213 may be stored in storage 206 or other storage and may be loaded into memory 205 for manipulation by processor 209 according to an embodiment of the invention. Portions of data such as seller information 214 and buyer information 215 may be loaded into data structures in memory 205 or other storage for manipulation by processor 209 in accordance with software such as web server 212 and real-time auction software 213. Web server 212 includes an operating system for managing system resources, such as Microsoft Windows XP, 2000, 98, or NT, Apple OS, Linux, or other operating systems as well as applications software running on top of the operating systems for implementing an HTML server or other server. Information stored in storage 206 may be stored in various forms of database arrangements and may contain cross references or links to one another to allow information to be queried and retrieved. In an example embodiment, the information is stored in databases, such as relational databases, and may be queried using structured query language (SQL) or other mechanism.

The system may include a secure connection or connections. For example, in an embodiment of the invention, the entire bidding operation of the system operates on a secure connection or connections. Various different technologies may be used to provide a secure connection, such as encryption with, for example, public key and private key encryption. The system may be set up over a virtual private network (VPN).

In an example embodiment, a seller operates seller system 202 through browser 223, communications software 221, and display 224 to set up seller inventory and seller events in seller information storage 214. The seller-user also manages the events and bidding through seller system 202, which communicates via Internet 204 with web server 212.

Buyer system 203 interacts with a buyer user, allowing the buyer user to view items and events including the items for auction. The interaction is provided to the buyer user through display 233, browser 232, and communications software 231, which are controlled by processor 230. Buyer system in turn communicates with auction server 201 via Internet 204. Web server 212 in turn provides buyer system 203 with graphical interface pages which may be displayed on display 233.

An embodiment of the invention is directed to a computerized system for vehicle management and purchasing. The system may include a database including information regarding vehicles in a set of vehicles. A plurality of the vehicles in the set of vehicles are in arrangements wherein third parties use the vehicles, and the information includes configuration of respective vehicles. The system may include a computer interface that provides access to the description of vehicles in the database and provides for setting price of respective vehicles. The system also may include an option on the user interface to search and search logic that allows for searching for vehicles among the set of vehicles in the database. The system additionally may include an option on the user interface to indicate intent to purchase a vehicle that is currently in an arrangement where a third party uses the vehicle. The system may include a computer interface that receives information regarding a vehicle returned upon conclusion of an arrangement wherein a third party used the vehicle, and a computer interface to facilitate purchase of the returned vehicle.

The third parties may comprise renters of respective vehicles and the arrangements wherein third parties use the vehicles may comprise rental agreements. Alternatively, or additionally, the arrangements wherein third parties use the vehicles may comprise lease agreements, or finance agreements, and the third parties may comprise owners of the vehicles.

The information regarding vehicles in the set of vehicles may include vehicle identification number (VIN), year, make, model, series, engine, transmission, drivetrain, and photographs of the vehicle. Also, alternatively, the information may include condition and price of respective vehicles. The information may also, or alternatively, include: the status of a contract associated with a vehicle, time remaining on a contract associated with a vehicle, payments made on a contract associated with a vehicle, amount owed on a contract associated with a vehicle.

The system may include an option on the user interface to allow a user to sell a vehicle earlier than a normally scheduled time to sell the vehicle. An embodiment of the system includes an interface for receiving information regarding a vehicle returned upon conclusion of an arrangement wherein a third party used the vehicle. The information may include items such as vehicle location, final mileage and responses to questions asked in connection with return of the vehicle. An embodiment may include logic that generates an electronic receipt upon return of a vehicle. Additionally, logic may be included that offers a vehicle exclusively to a grounding location of the vehicle for a period of time. Logic may be included that offers a vehicle exclusively to an entity having the grounding location of the vehicle for a period of time, and following receipt of an indication that the entity having the grounding location of the vehicle does not want to purchase the vehicle, offers the vehicle for purchase to others over a computer network.

Another embodiment of the invention is directed to an Internet-based system including a web server and a database coupled to the web server. The database includes information regarding vehicles in a set of vehicles. A plurality of the vehicles in the set of vehicles are in arrangements wherein third parties use the vehicles, and the information includes condition of respective vehicles. The system includes logic in the web server that serves a web page to a remotely located user providing access to the description of the vehicles in the database and provides for setting price of respective vehicles. Included logic serves a web page to a remotely located user providing an option to search and search logic that allows for searching for vehicles among the set of vehicles in the database. A user is prompted for information regarding a vehicle returned upon conclusion of an arrangement wherein a third party used the vehicle, and the web page is served to facilitate purchase of the returned vehicle. The arrangements wherein third parties use the vehicles may comprise rental agreements, lease agreements and finance agreements, according to various embodiments of the invention.

Another embodiment of the invention is directed to a method for vehicle management and purchasing. Information regarding the vehicles in a set of vehicles is managed electronically. A plurality of the vehicles in the set of vehicles are in arrangements wherein third parties use the vehicles, and the information includes configuration, condition and price of respective vehicles. Vehicles are searched for electronically among the set of vehicles, and search results are displayed. The search results include at least some of the vehicles not yet returned and information regarding status of the arrangement with the respective third party. Information is received electronically regarding the vehicle returned upon conclusion of an arrangement wherein a third party used the vehicle, and purchase of the returned vehicle is facilitated through an electronic interface.

An embodiment of the invention is directed to a computerized system for vehicle management. The system includes a database including information regarding the vehicles in the set of vehicles and customer accounts. The information regarding the vehicles includes configuration of respective vehicles, and the information regarding customer accounts includes links to vehicles in the set of vehicles owned by respective customers and status of customer accounts. The system includes a server coupled to the database that serves user interface pages with vehicle information including information from the database. A protected system login mechanism for system users is included, as well as logic implementing rules regarding a relationship between system users on the one hand and information regarding vehicles and customer accounts on the other hand. A search mechanism is included as well as a search results interface. The search mechanism finds respective vehicles or accounts based on search criteria. Logic is included in the server that serves a customer account interface. The customer account interface displays information regarding customer accounts to the extent allowed by the rules regarding the relationship between system users on the one hand and information regarding vehicles and customer accounts on the other hand.

The information regarding customer accounts may include information regarding payments and time remaining in leases in respective customer accounts. Also, the information regarding customer accounts may additionally or alternatively include information regarding payments and time remaining in loans in respective customer accounts.

An embodiment of the invention includes logic that defines a hierarchy of categories of dealers that may view particular information of respective customer accounts. The hierarchy may include preferred dealer users that can view most sensitive customer account information and at least another category of dealer users that have access to the system and cannot view certain customer account information. Logic may be included that makes information regarding the vehicle visible only to a preferred dealer if the vehicle has both an originating dealer and a preferred dealer.

An embodiment of the invention includes a first user interface for retail accounts and a second user interface for lease accounts. An embodiment of the invention may include pre-approval information. Another embodiment of the invention is directed to a computerized system for vehicle management including a database including information regarding vehicles in a set of vehicles and customer accounts. The system may include logic implementing rules regarding relationship between system users on the one hand and information regarding vehicles and customer accounts on the other hand. The system may include a search mechanism, customer account interface, and logic that causes the customer account interface to display information regarding some vehicles before the vehicles are returned and not other vehicles before the vehicles are returned based on rules for visibility of respective vehicles. The rules may be configurable to allow display based on existence of a condition report, status of maturity of an underlying financial arrangement for the vehicle, model year of the vehicle, and customer intent.

Another embodiment of the invention is directed to an Internet-based system comprising a web server, a database, protected system login, logic implementing rules regarding relationship between system users on the one hand and information regarding vehicles and customer accounts on the other hand, a search mechanism, logic for serving search results based on vehicles or accounts found based on search criteria, and logic serving a customer account web page. The database may include information regarding vehicles in a set of vehicles and customer accounts. Another embodiment of the invention is directed to a method for vehicle management. Information regarding vehicles in a set of vehicles is maintained electronically. A plurality of the vehicles in the set of vehicles are in arrangements wherein third parties use the vehicles. The information may include configuration, condition and price of respective vehicles. Users are prompted for passwords and vehicles are searched electronically among the set of vehicles. Search results are displayed and may include at least some vehicles not yet returned and information regarding the status of the arrangement with respect to the third party. Information may be received electronically regarding the vehicle returned upon conclusion of an arrangement wherein a third party used the vehicle, and in response to the user request with search criteria, vehicles or accounts are searched for based on the search criteria. A set of user permissions is maintained, wherein the user permissions determine whether respective users have access to respective accounts, and information displayed regarding customer accounts to users based on user permissions.

Aspects of the systems and methods described herein may be implemented as functionality programmed into any of a variety of circuitry, including programmable logic devices (PLDs), such as field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods include microcontrollers with memory, embedded microprocessors, firmware, software, etc. Furthermore, aspects of the systems and methods may be embodied in microprocessors having software-based circuit emulation, discrete logic (sequential and combinatorial), custom devices, fuzzy (neural network) logic, quantum devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

It should be noted that the various functions or processes disclosed herein may be described as data and/or instructions embodied in various computer-readable media, in terms of their behavioral, register transfer, logic component, transistor, layout geometries, and/or other characteristics. Computer-readable media in which such formatted data and/or instructions may be embodied include, but are not limited to, non-volatile storage media in various forms (e.g., optical, magnetic or semiconductor storage media) and carrier waves that may be used to transfer such formatted data and/or instructions through wireless, optical, or wired signaling media or any combination thereof. Examples of transfers of such formatted data and/or instructions by carrier waves include, but are not limited to, transfers (uploads, downloads, email, etc.) over the Internet and/or other computer networks via one or more data transfer protocols (e.g., HTTP, FTP, SMTP, etc.). When received within a computer system via one or more computer-readable media, such data and/or instruction-based expressions of components and/or processes under the systems and methods may be processed by a processing entity (e.g., one or more processors) within the computer system in conjunction with execution of one or more other computer programs.

Unless the context clearly requires otherwise, throughout the description and the claims, the words 'comprise,' 'comprising,' and the like are to be construed in an inclusive sense as opposed to an exclusive or exhaustive sense; that is to say, in a sense of 'including, but not limited to.' Words using the singular or plural number also include the plural or singular number, respectively. Additionally, the words 'herein,' 'hereunder,' 'above,' 'below,' and words of similar import refer to this application as a whole and not to any particular portions of this application. When the word 'or' is used in reference to a list of two or more items, that word covers all of the following interpretations of the word: any of the items in the list, all of the items in the list and any combination of the items in the list.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other processing systems and methods, not only for the systems and methods described above.

The elements and acts of the various embodiments described above can be combined to provide further embodiments. These and other changes can be made to the systems and methods in light of the above detailed description.

What is claimed is:

1. A computerized system for vehicle management and purchase comprising:
   a database including information regarding vehicles in a set of vehicles, wherein a plurality of the vehicles in the set of vehicles are in active contractual arrangements wherein third parties that include at least one of vehicle renters, vehicle lessees and vehicle owners are currently using the vehicles, wherein the information includes configuration of respective vehicles and a description of the vehicles;
   a user interface that provides access to the description of the vehicles in the database and provides for setting price of respective vehicles;
   an option on the user interface to search for vehicles among the set of vehicles in the database, wherein the option to search comprises maturities searching that enables the search for a vehicle based on dates on which the active contractual arrangement matures;
   an option on the user interface to indicate intent to purchase a vehicle that is currently in a first arrangement where a third party uses the vehicle;
   a user interface that receives information regarding a vehicle returned upon conclusion of a second arrangement wherein a third party used the vehicle, wherein the active contractual arrangements include the first arrangement and the second arrangement; and
   a user interface to facilitate a purchase of the returned vehicle.

2. The system of claim 1, wherein the third parties comprise renters of respective vehicles, and the active contractual arrangements wherein third parties use the vehicles comprise rental agreements.

3. The system of claim 1, wherein the active contractual arrangements wherein third parties use the vehicles comprise lease agreements.

4. The system of claim 1, wherein the active contractual arrangements wherein third parties use the vehicles comprise finance agreements and the third parties comprise owners of the vehicles.

5. The system of claim 1, including a web server that serves web sites including the user interface that provides access to the description of the vehicle, wherein the web server is coupled to the database including the description of vehicles in the set of vehicles.

6. The system of claim 1, wherein the information regarding vehicles in the set of vehicles includes vehicle identification number (VIN), year, make, model, series, engine, transmission, drivetrain, and photographs of the vehicle.

7. The system of claim 1, wherein the information regarding vehicles in a set of vehicles includes condition and price of respective vehicles.

8. The system of claim 1, wherein the information regarding vehicles in a set of vehicles includes status of the active contractual arrangement associated with a vehicle.

9. The system of claim 1, wherein the information regarding vehicles in a set of vehicles includes time remaining on the active contractual arrangement associated with a vehicle.

10. The system of claim 1, wherein the information regarding vehicles in a set of vehicles includes payments made under the active contractual arrangement associated with a vehicle.

11. The system of claim 1, wherein the information regarding vehicles in a set of vehicles includes amount owed under the active contractual arrangement associated with a vehicle.

12. The system of claim 1, including an option on a user interface to allow a user to sell a vehicle earlier than a normally scheduled time for sale of the vehicle.

13. The system of claim 1, including a user interface to receive information regarding a vehicle returned upon conclusion of the active contractual arrangement wherein a third party used the vehicle.

14. The system of claim 1, wherein the information regarding a vehicle returned upon conclusion of the active contractual arrangement wherein a third party used the vehicle includes vehicle location, final mileage and responses to questions asked in connection with return of the vehicle.

15. The system of claim 1, including logic that generates an electronic receipt upon return of a vehicle.

16. The system of claim 1, including logic that offers a vehicle exclusively to a grounding location of the vehicle for a period of time.

17. The system of claim 1, including logic that offers a vehicle exclusively to an entity having the grounding location of the vehicle for a period of time and, following receipt of an indication that the entity having the grounding location of the vehicle does not want to purchase the vehicle, offers the vehicle to others for purchase over a computer network.

18. The system of claim 1, including logic that sends electronic notification to a transporter with respect to returned vehicles.

19. An Internet-based system comprising:
   a web server;
   a database coupled to the web server, the database including information regarding vehicles in a set of vehicles, wherein a plurality of the vehicles in the set of vehicles are in active contractual arrangements wherein third parties that include at least one of vehicle renters, vehicle lessees and vehicle owners are currently using the vehicles, wherein the information includes configuration of respective vehicles and a description of the vehicles;

logic in the web server that serves a web page to a remotely located user providing access to the description of the vehicles in the database and provides for setting price of respective vehicles;

logic in the web server that serves a web page to a remotely located user providing an option to search and search logic that allows for searching for vehicles among the set of vehicles in the database, wherein the option to search comprises maturities searching that enables the search for a vehicle based on dates on which the active contractual arrangement matures;

logic in the web server that serves a web page to a remotely located user that prompts for information regarding a vehicle returned upon conclusion of an arrangement wherein a third party used the vehicle, wherein the active contractual arrangements include the arrangement; and logic in the web server that serves a web page to a remotely located user to facilitate a purchase of the returned vehicle.

20. The system of claim 19, wherein the active contractual arrangements wherein third parties use the vehicles comprise rental agreements, lease agreements, and finance agreements.

21. The system of claim 19, wherein the information regarding vehicles in a set of vehicles includes information regarding time remaining on the active contractual arrangement associated with a vehicle.

22. The system of claim 19, wherein the information regarding vehicles in a set of vehicles includes status of payments under the active contractual arrangement associated with a vehicle.

23. A method for vehicle management and purchase comprising:

electronically maintaining information regarding vehicles in a set of vehicles, wherein a plurality of the vehicles in the set of vehicles are in active contractual arrangements wherein third parties that include at least one of vehicle renters, vehicle lessees and vehicle owners are currently using the vehicles, wherein the information includes configuration, condition, and price of respective vehicles;

electronically searching for vehicles among the set of vehicles, wherein the searching comprises maturities searching that enables the search for vehicles based on dates on which the active contractual arrangements mature, and displaying search results, the search results including,
at least some vehicles not yet returned, and
information regarding status of the active contractual arrangements with the respective third party;

electronically receiving information regarding a vehicle returned upon conclusion of an arrangement wherein a third party used the vehicle, wherein the active contractual arrangements include the arrangement; and facilitating a purchase of the returned vehicle through an electronic interface.

24. The method of claim 23, wherein the active contractual arrangements wherein third parties use the vehicles comprise rental agreements, and the status of the active contractual arrangement with the respective third party includes status of payment of the rental agreement.

25. The method of claim 23, wherein the active contractual arrangements wherein third parties use the vehicles comprise lease agreements, and the status of the active contractual arrangement with the respective third party includes an indication of time remaining in term of a respective lease of the respective vehicle.

26. The method of claim 23, wherein the information regarding vehicles in a set of vehicles includes status of payments made for the vehicle.

27. The method of claim 23, automatically providing an electronic request for transport of a returned vehicle.

28. The method of claim 23, including offering a vehicle exclusively to an entity having the grounding location of the vehicle for a period of time and, following receipt of an indication that the entity having the grounding location of the vehicle does not want to purchase the vehicle, offering the vehicle to others over a computer network for purchase.

* * * * *